United States Patent [19]

Sonderegger et al.

[11] Patent Number: 4,519,254
[45] Date of Patent: May 28, 1985

[54] HIGH PRESSURE TRANSDUCER

[75] Inventors: Hans-Conrad Sonderegger, Neftenbach; Eugen Lutz, Winterthur, both of Switzerland

[73] Assignee: Kistler Instrumente A.G., Winterthur, Switzerland

[21] Appl. No.: 481,880

[22] Filed: Apr. 4, 1983

[30] Foreign Application Priority Data

Apr. 6, 1982 [EP]  European Pat. Off. ........ 82102930.3

[51] Int. Cl.³ .......................... G01L 9/08; G01L 23/10
[52] U.S. Cl. ........................................ 73/726; 73/167; 73/756; 73/DIG. 4
[58] Field of Search .................. 73/35, 167, 723, 724, 73/725, 726, 727, 728, 756, 715; 338/42; 310/338

[56] References Cited

U.S. PATENT DOCUMENTS

| | | | |
|---|---|---|---|
| 2,629,801 | 2/1953 | Warshaw | 73/726 |
| 3,225,859 | 12/1965 | Davidson | 73/726 |
| 3,244,006 | 4/1966 | Delmonte | 73/727 |
| 3,247,719 | 4/1966 | Chelner | 73/756 |
| 3,587,322 | 6/1971 | Lobdell et al. | 73/756 |

Primary Examiner—S. Clement Swisher
Assistant Examiner—John E. Chapman, Jr.
Attorney, Agent, or Firm—Craig & Burns

[57] ABSTRACT

A high pressure transducer, especially for ballistic pressure measurements, with a body member and a sensor part, the body member can be screwed into a threaded mounting bore provided in a structural component, whereby the body member comes into sealing contact with its sealing surface against a seating surface of the mounting aperture. The body member is provided with a recess, into which projects an extension on the sensor part to be secured along its end-face on the body member. An annular gap is provided between the extension of the sensor part and the recess in the body member, which causes the force flux lines produced by the sealing forces not to pass through the sensor part so that the latter remains unaffected by changing conditions of the force flux lines, i.e. by the prevailing tightening torques.

15 Claims, 5 Drawing Figures

HIGH PRESSURE TRANSDUCER

The present invention relates to a high pressure transducer with a body member for securement in a mounting aperture provided in a structural component, with a sensor part connected with the body member and having a membrane portion for actuation of a sensor element and a means for forming a seal between the transducer and the mounting aperture.

In the technology, the measurement of pressure changes in the ranges from 0 to 1000 and 0 to 10,000 bar constitutes a special field, which ballistics experts in particular have intensively studied for several decades. In hydraulics, peak pressure values of up to 2,000 bar occur in injection processes in diesel engines. In the more recent pulse-cutting processes, hydraulic pressure peaks of up to 4,000 bar occur. However, pressures which go beyond these values are encountered almost exclusively in the development of explosives and in ballistics.

The present invention is therefore concerned in particular, but not exclusively, with pressure transducers for the determination of such higher pressures. One preferred field of use is thus represented by ballistic pressure measurements, in order to determine the pressure changes in rifles and guns during the firing of rounds. Such measurements are necessary for research purposes in the further development of barrels and rounds. For the development of charges, corresponding measurements are carried out in so-called pressure bombs. Another area of use is represented by high pressure measurements in fluid media. In all cases, operations are involved which last a few milliseconds and exhibit pressure amplitudes of up to 10,000 bar.

For over 100 years, such measurements have been carried out with the help of copper strain elements, which continue to be used even today in munitions acceptance. For about 20 years, this measuring technique has concentrated increasingly on electronic measuring methods with piezoelectric transducers. The piezo measuring technique has proved to be practically unique for these high-stressed dynamic uses, because of the extremely high resolution which permits to follow in fractions of a bar, the initial ignition process in the pressure range of a few bars as also the main combustion process with pressures up to 10,000 bars. Additionally, the piezo effect, as a volume effect in piezo crystals, allows measurements practically without deformation since the quartz crystals of relatively large dimensions which are used, exhibit very advantageous elasticity properties and possess substantially higher compressive strengths than constructions with highest quality steels. The membrane portions of such transducers thus undergo minimal bending, as a result of which a high useful life is attained.

For the pressure-tight mounting of such transducers in a pressure container, the mounting apertures or bores required therein as also the transducer dimensions have been largely standardized in recent years, particularly after NATO had issued certain standards and specifications. Thus, in the main, two kinds of sealing arrangements have become standardized:
1. Transducer with shoulder seal;
2. Transducer with blind-hole seal.
The mounting threads are:
M10 or exceptionally M 12 in Europe, ¾ USFC in USA.

In Europe, transducers with shoulder seals are used almost exclusively, whereas in USA blind-hole seals are generally preferred. NATO specifies transducers with shoulder seals.

In view of the very flat pressure pulses with unusually high amplitudes, the sealing question plays a major role. The smallest leakage traces at a seal produces flash flame pressure pulses, as a result of which the transducer burns out after a few firings and thus becomes unusable. Often lapped seating-or sealing-surfaces are specified, for which no additional sealing means in the form of sealing-rings are required. However, after each transducer disassembly, a subsequent lapping of the seating surfaces is necessary. Thin copper rings are therefore used frequently, which at times are difficult to remove from the seating surfaces. For over 10 years, self-adjusting steel sealing rings according to the German Patent No. 17 75 646 have proved themselves, which ensure a completely satisfactory sealing. A torque of 10 Nm is sufficient for the secure seating of the transducer, without having to fear any loosening. Other transducers without such sealing rings require torques of up to 60 Nm, which has as a consequence corresponding deformations of the sealing surfaces.

FIG. 1, which will be referred to in greater detail hereinafter, illustrates a typical known piezoelectric high pressure transducer with a shoulder seal. In view of the high sealing torques during installation, no transducers have been available on the market up till now, whose sensitivity is not influenced by the mounting operation. This is based on the fact that the force flux lines introduced or established in the transducer during mounting are transmitted through sensitive sensor parts, whereby deformations are also transmitted to the membrane parts of the transducer. Depending upon the micro-construction of the sealing part, a different sensitivity thus results for each mounting or installation, so that it is often impossible to achieve a satisfactory measuring accuracy and reproducibility.

In contrast thereto, the present invention is based upon the task of providing a transducer of the type in question, which is practically insensitive to different sealing torques.

The underlying problems are solved in accordance with the invention in that an annular gap is provided between the sensor part and the body member, which substantially keeps away from the sensor part the force flux lines stemming from the sealing forces which are produced when sealing the transducer relative to the mounting bore provided in the structural component to be tested.

The transducer for shoulder sealing according to the present invention offers particular advantages when used for ballistic pressure measurements, since its membrane portion is substantially unobstructed by any further transducer components.

The transducer of this invention serves for measuring rapidly varying pressure changes with high peak values and is characterized both by a high constancy of its operating sensitivity as also by a long effective life, since the sensitive membrane portions are not subjected to the sealing forces or are subjected to such forces only to a nominal, insignificant extent. The sensitivity of the transducer is not influenced by the magnitude of the starting torque when screwing the transducer into the mounting aperture or by the elastic limiting conditions in the mounting aperture or by ageing effects. It is assured thereby that, independently of the given individual installation conditions, both the measuring accuracy itself as also its reproducibility remain unaltered.

These and other objects, features and advantages of the present invention will become more apparent from the following description when taken in connection with the accompanying drawing which shows, for purposes of illustration only, several embodiments in accordance with the present invention, and wherein.

Figure 1:
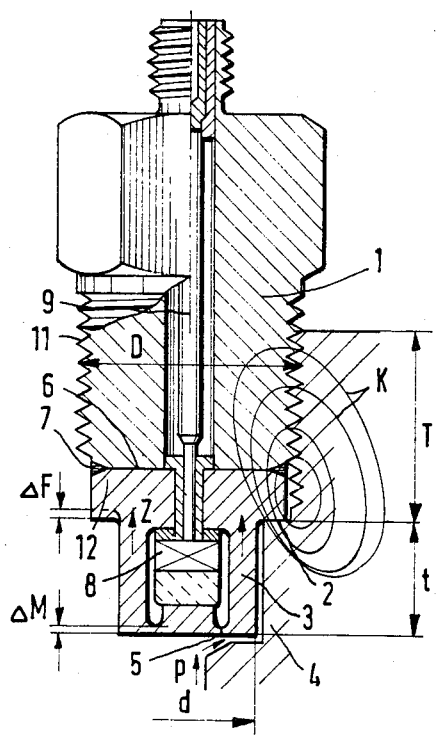
FIG. 1 is a view, partly in longitudinal cross section, of a prior art high pressure transducer with a shoulder seal.

The terms "upper" and "lower" used hereinafter refer to the position of the transducer components as shown in the drawing.

Referring now to the drawing, wherein like reference numerals are used throughout the various views to designate like parts, FIG. 1 shows a known high pressure transducer with shoulder seal. As illustrated, the transducer essentially comprises two main parts, namely a sensor part 3 and a body member 1. A sealing flange 12 is provided in the upper area of the sensor part 3. The transducer is arranged in a mounting aperture or bore 4 provided in the component undergoing examination; the aperture 4 consists of a lower portion t with a smaller diameter d and of an upper portion T with a larger diameter D, the two aperture portions being mutually concentric. In the transition from one portion of the aperture to the other, a seating or shoulder surface 2 is formed, with which the sealing flange 12 on the sensor part 3 comes into sealing contact and which lies exactly at right-angles to the median longitudinal axis of the aperture portions T, t. As illustrated, the upper aperture portion T is provided with an internal screw thread, into which an external screw thread 11 on the body member 1 of the transducer can be screwed. Because of the requisite high accuracy of the boring, countersinking, surface lapping and thread-cutting operations involved, the specific tools required therefor are usually supplied by the transducer manufacturer.

A sensor element 8 is arranged in a recess in the sensor part 3, as illustrated, which preferably comprises one or several suitable piezo crystals, whose electric charges are transmitted to the outside by one of a signal lead 9 extending through the body member 1. The free lower end face of the transducer is partially formed by an inwardly-thickened membrane portion 5, which transmits as a force to the sensor element 8 the pressure signal produced by the media pressure p and is preferably manufactured in one piece with the sensor part 3. The sensor part 3 itself is welded to the body member 1 along its upper contact surface 6 facing the body member 1, as shown at 7. In this known type of transducer, the pressure p of the medium acts both on the membrane portion 5 as also on the free external surface of the sensor part 3 up to the sealing area between the sealing flange 12 and the seating surface 2.

The pressure force transformation is thus carried out in an extremely complex arrangement. The necessary contact pressure of the sealing flange 12 against the seating surface 2 of the mounting aperture is produced when screwing the body member 1 into the aperture portion T. Sealing torques of 30 to 60 Nm are necessary therefor. Correspondingly, these very high pre-stressing forces produce force flux lines K, as indicated, which extend onto sensitive sensor parts. The sealing flange 12 of the sensor part 3 is shortened by the high stresses by an amount $\Delta F$, which generates an annularly-distributed force Z. This, in turn, causes a movement of the clamped membrane portion by $\Delta M$, which results in a change of the pre-stress and thus also of the sensitivity of the transducer. The pressure p of the medium causes a change in the static force flux lines K, which has a further reaction on the transducer sensitivity. The thermal components of a gas pulse have a further substantial influence on the membrane portion and produce additional stresses on the membrane portion 5, which have as a consequence dynamic errors in the measurement.

Figure 2:
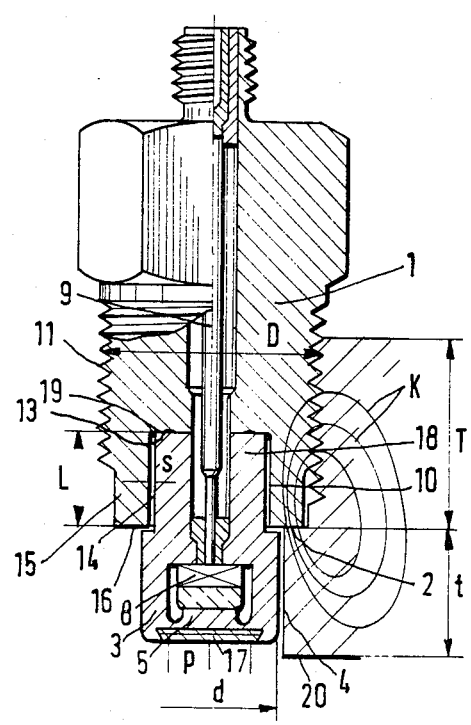
FIG. 2 is a view, similar to FIG. 1, of a high pressure transducer with a shoulder seal according to the present invention.

The high pressure transducer with shoulder seal constructed according to the present invention, which is free from sealing, contact and torque influences, is shown in FIG. 2. The advantage is thereby attained by the shoulder seal that the membrane portion 5 of the transducer can be arranged flush with the measuring chamber surface 20 or with a pressure-conducting access aperture (see FIG. 1).

The transducer according to FIG. 2 can have the same installation dimensions D,d as the above-described known transducer. The depth of the upper aperture portion T to the seating surface 2 as well as the depth of the lower portion t of the mounting aperture 4 lie in the range of the known limiting values. According to the present invention, the sensor part 3 is so arranged in relation to the body member 1 that the force flux lines K, resulting from the pressure-tight screwing-in of the body member 1 into the mounting aperture 4, are separated relative to the sensor part 3 by an annular insulating gap 14. The sensor part 3 can thus be arranged far-reachingly freely suspended in the measuring chamber aperture. As illustrated, the supporting surface 13 of the sensor part 3 facing the body member 1, unlike in the known kind of transducer, is displaced or set back relative to a shoulder sealing surface 16 of the body member 1 by a distance L, so that the supporting surface 13 of the sensor part 3 is located at the level of the lowest screw threads 11 on the body member 1. For this purpose, a recess 10 is formed in the body member 1 under formation of a tubular peripheral wall 15, into which projects a tubular extension area 18 of the sensor part 3, as illustrated. The annular gap 14 remains between the outer peripheral surface of the tubular extension area 18 of the sensor part 3 and the inner peripheral surface of the recess 10 in the body member 1; the width S of the annular gap 14 may be in the range from approximately 0.01 to 0.1 mm. As indicated at 19, the tubular extension 18 of the sensor part 3 can be fixedly connected to the base of the recess 10 by means of an annular projection-butt weld.

The sealing of the transducer with respect to the mounting aperture takes place according to the instant invention by abutting engagement of the annular end face 16 provided on the peripheral wall 15 of the body member 1 at the contact surface 2 of the mounting aperture. As a result thereof, the force flux lines K are conducted toroidally directly into the shoulder sealing surface 16, thereby bypassing the sensor part 3. By providing the annular insulating gap 14, no direct force transmission to the sensor part 3 is possible, even in case of any deformation of the tubular wall 15 of the body member 1 defining the recess 10, so that the sensor part 3 remains uninfluenced by the changing conditions of the force flux lines, that is, by the prevailing contact torque values. The force flux lines produced by the sealing force extend in direct proximity to the geometric connecting lines from the supporting screw turns of the screw thread 11 to the sealing shoulder 2. It is the essential feature of the construction according to the present invention that these lines do not pass over portions of the sensor part 3, as is the case in FIG. 1. Thus optimum coupling conditions of the sensor part 3 to the body member 1 are obtained. The annular gap 14 is open toward the pressure medium, which means that a definite pressure, namely the measuring pressure, prevails in all of the surroundings of the sensor part 3. It is not possible to avoid the pressure surrounding the sensor part 3 from having a certain influence on the latter. However, since this pressure influence is related substantially linearly with the measuring pressure, this necessitates only a small alteration of the calibration factor, which is taken into consideration virtually automatically during calibration of the transducer. The effect of the measuring pressure in the gap 14 additionally has as a consequence that the body member is widened in the region of the recess 10 and thereby counteracts the play in the thread 11. This leads to a better reproducibility of the seating of the transducer in the pressure container. For the purpose of protection against thermal overloads, the membrane portion 5 can be protected with replaceable thermoprotection inserts 17. Such insert plates are mentioned in Swiss Patent No. 446 761. By suitably modifying the membrane portion by means of concentric perforations, as described for example in the Swiss Patent No. 587 478, pressure-elastic membrane constructions can be achieved which are nonetheless very stable.

Figure 3:
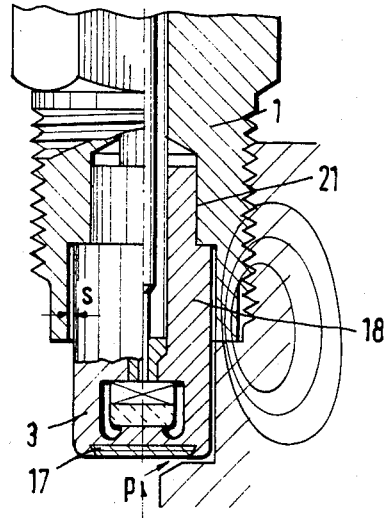
FIG. 3 is a view, similar to FIG. 2, of the front part of a modified embodiment of a high pressure transducer according to the present invention.
Figure 4:
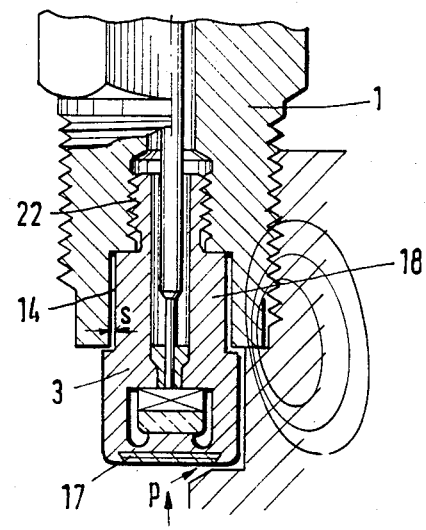
FIG. 4 is a view, similar to FIG. 3, of the front part of a still further modified embodiment of a high pressure transducer according to the present invention.

FIG. 3 illustrates a modification of the transducer according to FIG. 2. The transducer of FIG. 3 is characterized in that the sensor part 3 comprises an upper tubular extension 21, which is held by shrink fit or pressure fit in a correspondingly-dimensioned aperture in the body member 1. A further modification of the connection of the sensor part 3 with the body member 1 is shown in FIG. 4, where an additional upper threaded extension 22 is formed on the tubular extension 18 of the sensor part 3 which can be screwed into a corresponding threaded bore in the body member 1, in order to locate and fasten the sensor part 3. It will be understood that the present invention is not limited to the various means for securing the sensor part 3 to the body member 1, as illustrated and described, but that also other connections may be provided, which are within the knowledge and scope of persons skilled in the art.

Figure 5:
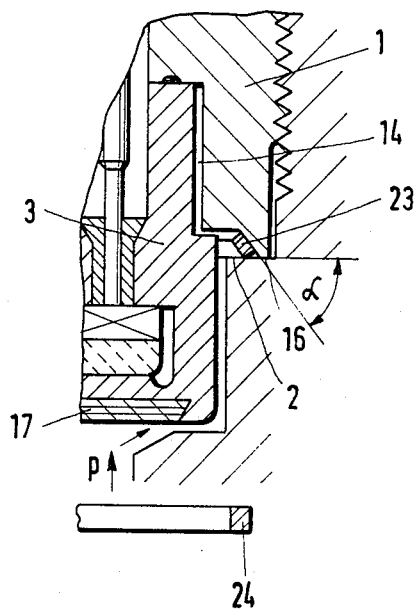
FIG. 5 is a partial view in longitudinal cross section of still another embodiment of a high pressure transducer according to the present invention with a shoulder seal and steel sealing rings.

FIG. 5 illustrates a partial section of a modified high pressure transducer according to the present invention, with a shoulder seal. Instead of the flat sealing surface of the body member 1 shown in FIG. 2, a sealing surface with an inclined recess is provided in FIG. 5, which forms a conical surface that lies at a suitable angle α with respect to the plane defined by the seating surface 2 of the mounting aperture. During the installation of the transducer, a metal sealing ring 23, described in detail in German Patent No. 1775646, comes into contact with this conical surface. Prior to the installation, the metal sealing ring 23 represents a tubular portion 24 (see FIG. 5, below) which, by elastic deformation during the installation, assumes the shape shown in FIG. 5 and produces a completely satisfactory seal even with very small contact torques.

The provision according to the invention of an insulating gap 14 between the stressed components and the sensor parts provides a completely satisfactory separation of the force flux lines K, set up by the mounting and sealing forces, from the sensor part 3. According to the present invention, high pressure transducers are thus provided, which give accurate unfalsified measuring results independently of the always varying installation conditions.

It will be understood that the present invention can be altered and modified in accordance with the teachings herein without departing from the scope thereof. For example, instead of the preferred use of piezo crystals as the sensor elements, resistance-measuring elements, such as strain gauges or piezo-resistive sensors, can also be provided.

Consequently, the present invention is not limited to the details shown and described herein but encompass all those changes and modifications thereof, as known to a person skilled in the art, and we therefore do not wish to be limited to these details but intend to cover all such changes and modifications thereof as are encompassed by the scope of the appended claims.

We claim:

1. A high pressure transducer having an externally threaded portion and operable to be threadably secured in a mounting aperture having an internally threaded portion and provided in a structural component, comprising a body member provided with said threaded portion, a sensor part connected with the body member and having a membrane portion for actuating a sensor element, means adapted to form a shoulder seal between mutually abutting surfaces of the transducer and the mounting aperture, said seal being located ahead of the threaded portion, and further means in said transducer operable to substantially keep away from the sensor part the force flux lines stemming from the sealing forces which are produced when sealing the transducer relative to the structural component including an annular gap between the sensor part and the body member, said annular gap being open toward the pressure medium to be measured by the transducer.

2. A transducer according to claim 1, characterized in that the annular gap is provided between a peripheral wall of the body member and a portion of the sensor part and has a gap width in the range of 0.01 to 0.1 mm.

3. A transducer according to claim 2, wherein said portion of the sensor part is an extension formed on the sensor part.

4. A transducer according to claim 3, characterized in that a contact surface of the sensor part engaging with the body member is spaced with respect to a shoulder sealing surface provided on the body member by an amount which is at least so large that the contact surface lies at least at the level of the first supporting turns of a screw thread provided on the body member.

5. A transducer according to claim 4, characterized in that the sensor part is secured to the body member by means of an annular projection or butt weld.

6. A transducer according to claim 5, characterized in that the force flux lines which lead from the supporting thread turns to the shoulder sealing surface of the mounting aperture essentially do not pass through the sensor part.

7. A transducer according to claim 4, characterized in that the sensor part is secured to the body member by a threaded extension.

8. A transducer according to claim 4, characterized in that the sensor part is secured to the body member by a shrinkage press-fit.

9. A transducer according to claim 4, characterized in that the shoulder sealing surface of the body member has a conical recess for receiving therein a metal sealing ring.

10. A transducer according to claim 1, characterized in that a contact surface of the sensor part engaging with the body member is spaced with respect to a shoulder sealing surface provided on the body member by an amount which is at least so large that the contact surface lies at least at the level of the first supporting turns of a screw thread provided on the body member.

11. A transducer according to claim 10, characterized in that the shoulder sealing surface of the body member has a conical recess for receiving therein a metal sealing ring.

12. A transducer according to claim 10, characterized in that the force flux lines which lead from the supporting thread turns to the shoulder sealing surface of the mounting aperture essentially do not pass through the sensor part.

13. A transducer according to claim 1, characterized in that the sensor part is secured to the body member by means of an annular projection or butt weld.

14. A transducer according to claim 1, characterized in that the sensor part is secured to the body member by a threaded extension.

15. A transducer according to claim 1, characterized in that the sensor part is secured to the body member by a shrinkage press-fit.

* * * * *